W. L. MORELAND.
QUICK ATTACHABLE COUPLING.
APPLICATION FILED JUNE 12, 1916.

1,286,715.

Patented Dec. 3, 1918.
2 SHEETS—SHEET 1.

Witness.
E. R. Pollard

Inventor.
Watt L. Moreland.
By Cassell Severance
Atty.

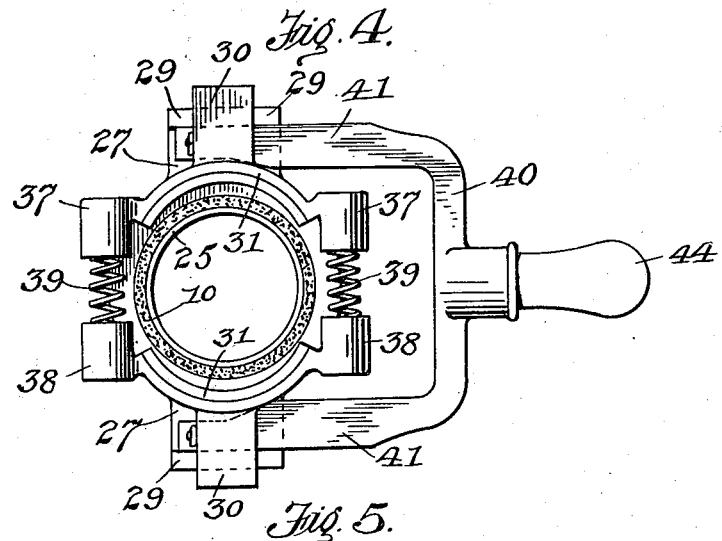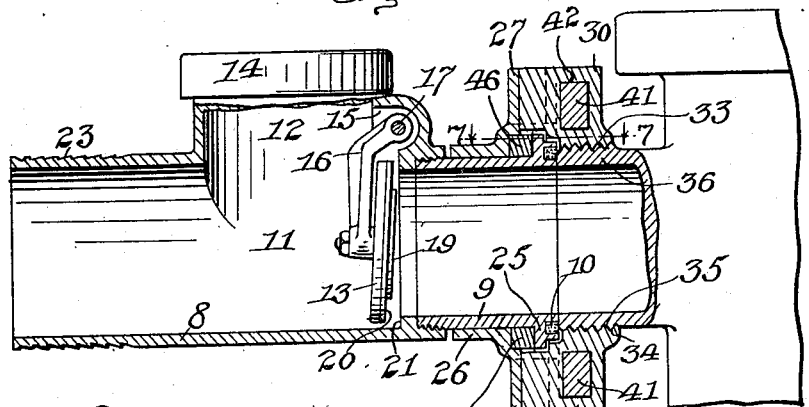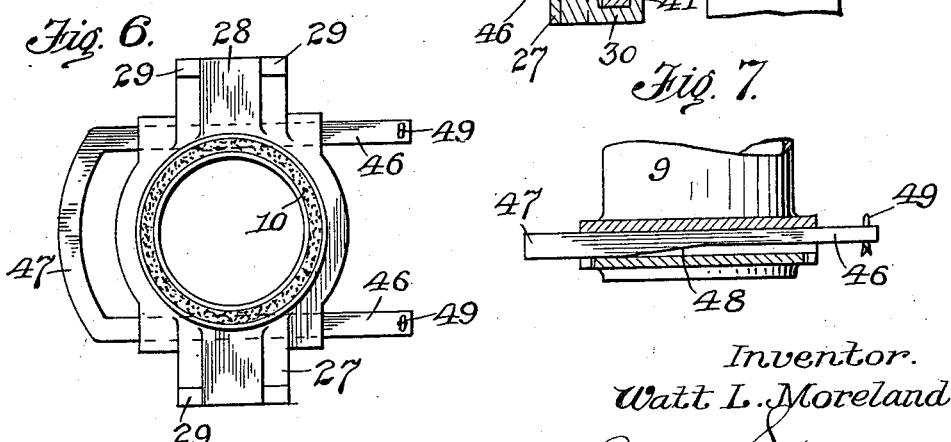

UNITED STATES PATENT OFFICE.

WATT L. MORELAND, OF LOS ANGELES, CALIFORNIA, ASSIGNOR OF ONE-HALF TO MORELAND MOTOR TRUCK COMPANY, A CORPORATION OF CALIFORNIA.

QUICK-ATTACHABLE COUPLING.

1,286,715.     Specification of Letters Patent.     Patented Dec. 3, 1918.

Application filed June 12, 1916. Serial No. 103,080.

*To all whom it may concern:*

Be it known that I, WATT L. MORELAND, a citizen of the United States, residing at Los Angeles, in the county of Los Angeles and State of California, have invented certain new and useful Improvements in Quick-Attachable Couplings, of which the following is a specification.

This invention relates to improvements in coupling devices and particularly to quick detachable hose couplings. It is especially suited to the coupling of hose piping to water supply means such as street hydrants or the like.

The invention comprises a coupling having separable jaws and means for clamping the same upon the discharge outlet of a plug or other water supply device.

It is also an object of the invention to provide a quick detachable coupling having separable jaws formed with thread engaging means and means for drawing the jaws together to fit upon the threaded outlet of a water plug or other device.

It is also an object of the invention to provide a coupler of this kind with a divided ring having interior threads, a member adapted to draw the parts of said ring together around an exteriorly threaded discharge opening, the coupling also having a member adapted to form a tight joint with the said outlet member upon the tightening of the said divided ring.

It is a still further object of the invention to provide a hose coupling with a gasket carrying seat engaging member and a divided clamping member having interior threads adapted to fit upon the threaded discharge member of a hydrant or the like, a yoke member being also provided for drawing the divided clamp member together upon said discharge member, a turning of said clamp member operating to make a tight joint.

It is also a further object of the invention to provide a quick detachable hose coupling having a valve chamber therein and having a check valve adapted to prevent liquids from running out of the coupling when it is detached, the valve carrying portion of the device having an adjustable divided clamping device normally spread to its open position, means also being provided for adjusting it to its closed position in making a coupling.

With these and other objects in view, the mechanism comprises certain other novel constructions and arrangements of parts as will be hereinafter more fully described and claimed.

In the accompanying drawings forming a part of this specification:

Fig. 4 is a similar end view but showing the parts in open position.

Fig. 5 is a longitudinal sectional view similar to Fig. 1 but showing an auxiliary tightening mechanism for assisting in the seating of the coupler.

Fig. 6 is a transverse view of the coupler looking at the seating end thereof, but showing the yoke or wedge member removed.

Fig. 7 is a detail sectional view taken upon the line 7—7 of Fig. 5.

Figure 1:
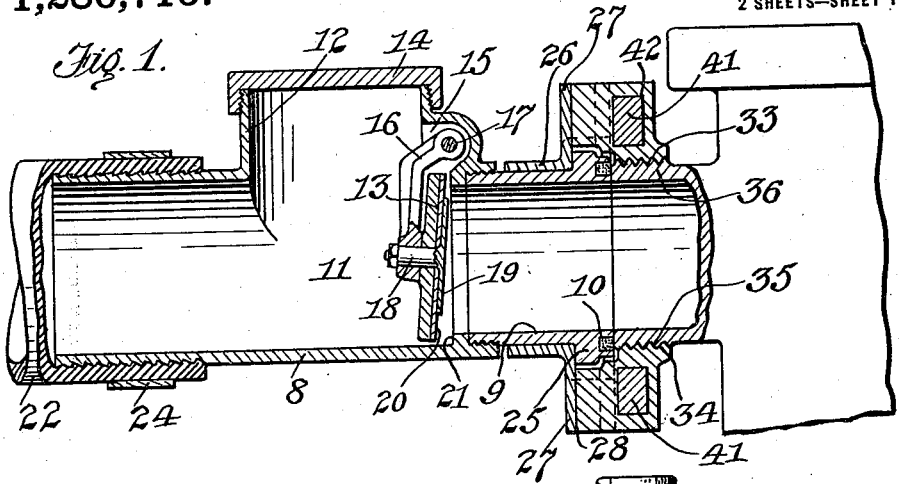
Figure 1 is a longitudinal central sectional view through a coupling device made in accordance with this invention, adjacent parts of a hose pipe and a water plug being also shown.
Figure 2:
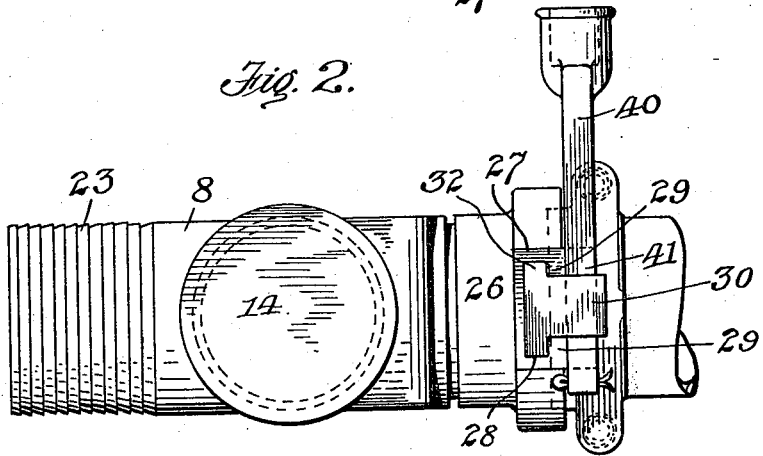
Fig. 2 is a top plan view of the same with the exception of the piping and the plug.

The coupler forming the subject matter of this invention is designed to afford a quick means for attaching and detaching a hose to a water supply, as for instance in connecting the hose of a water wagon or cart to the outlet of a hydrant for filling the water cart or wagon. Of course the invention is not limited to the use of the device with a water cart or street sprinkling wagon, but the invention has been illustrated by showing a connection adapted for such use. The features and details of the invention will now be more specifically described with reference to the said illustration, 8 in said illustration indicating the body portion of the coupling, while 9 indicates a seat engaging member preferably carrying a gasket or packing means set in the outer or hydrant engaging edge thereof. The said seat engaging member 9 is usually screw threaded into the end of the body portion 8. The said body portion 8 of the coupling is preferably formed with a valve chamber 11 from which projects in one direction a branch device 12 which is open at its outer end whereby access can be had to the valve 13 mounted within said chamber. The outer edge of the branch portion 12 is screw threaded and a removable cap 14 is employed for closing the said branch. The valve chamber 11 is also provided with a recess 15 in which the end of an arm 16 is pivotally secured as at 17. The said arm 16 is bent intermediate of its length so that it projects from the recess 15 inwardly and downwardly into the valve chamber 11. The arm 16 carries the valve 13 at its inner end, said valve being usually in the form of a disk having a central stud 18 projecting therefrom and engaging an opening in the lower end of the said arm 16. The stud 18 is usually formed with a broad head 19 on the outer face of the valve adapted to hold a washer or gasket 20 upon the face of the valve, the outer edge of which engages a valve seat 21 formed within the outer end of the body portion 8. The valve is thus held within the valve chamber so that when the coupling is in a horizontal position the valve will swing downwardly upon the said valve seat 21. The angular mounting of the arm 16 within the recess 15 is such that the valve could not swing so far open as to prevent any water pressure from the hose piping from seating the valve and preventing the water from running out of the hose and coupling especially when the coupling is disconnected. The valve of course will not interfere with the entrance of water into the valve chamber from the coupling end of the device. The cap 14 is normally in closed position over the mouth of the branch portion 12 and is only removed when access to the valve is desired. The end of the body portion 8 which engages the hose or piping 22 is preferably formed with circular serrations or sharp annular shoulders 23 for obtaining a firm hold upon the interior of the hose 22, especially when a clamping bar band 24 of any type is secured upon the outside of the hose over the serrated portion of the body portion 8.

The outer end of the portion 9 of the coupling is formed with an enlargement or circular flange 25 which carries the gasket
10. Loosely mounted on the seat member 9 and held in place by the shoulder or flange 25, is a ring 26 which has a broad collar portion swiveled upon the seat member 9. Oppositely arranged outwardly extended projections 27 are carried by said ring 26 and are provided with recesses forming guide ways 28 extending radially with respect to the member 9. The outer ends of said projections 27 have inturned projections 29 forming with the said recess a holding means for projections 30 which are carried by the coupling jaws 31 of the device. The said projections 30 have oppositely extending flanges 32 adapted to engage the guide ways 28 of the projections 27 on the ring 26. The inturned projections 29 form T shaped recesses in connection with the said recess 28 for holding the said projections 30 and yet permitting of their movement in and out.

Figure 3:
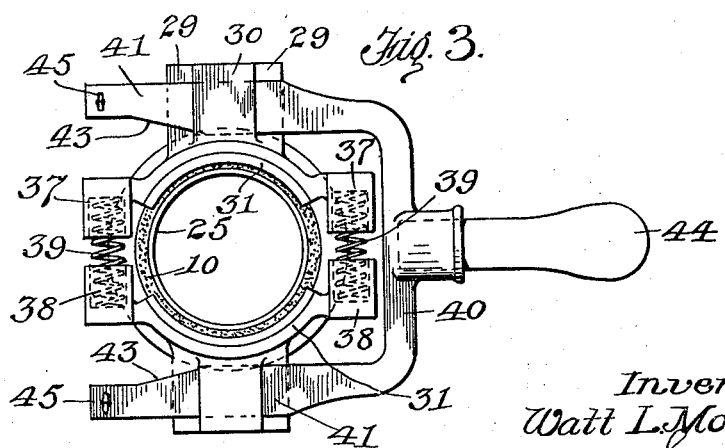
Fig. 3 is an end view of said coupling showing the separable jaws thereof and the operating yoke member, the parts being in closed position.

The inner ends of the projections 30 carry approximately semi-circular jaws 31, the two jaws when applied together not forming a complete circle, as clearly shown in Figs. 3 and 4 of the drawings. The inner faces of the jaws are arc shaped and preferably provided with screw threads 33 and 34 adapted to fit the threads 35 of the hydrant outlet portion 36. The structure being such that when the jaws are drawn together they will form a mutilated ring upon the said threads 36 for tightly holding the coupling upon the hydrant outlet.

The said jaws have socketed projections 37 and 38 upon the opposite ends of the arc portions of the opposite ends thereof, and springs 39 are interposed between the jaws, their ends being seated in the sockets of the said portions 37 and 38 as clearly shown in Figs. 3 and 4. The tendency of these springs is to spread the jaws apart. The position of the jaws with respect to each other is further controlled by a wedge device comprising a yoke 40 having wedge shaped arms 41 which extend through lateral openings 42 formed in the outer ends of the arms 30 of the jaws. The said wedge portions 41 have an inclined or other shaped cam or wedge surface 43 arranged so that when the yoke 40 is pushed inwardly toward the coupling device, that they will force the jaws toward each other, and cause them to close upon the outlet branch of the hydrant or plug. The thickest portions of the wedge shaped arms 41 will be accommodated in the recesses 42. Any outwardly spreading tendency of the yoke arms is prevented by the engagement of said arms with the flanges or inturned portions 29 of the projections 27 of the ring 26. When the yoke 40 is thrust inwardly so as to bring the thickest portions of the wedge shaped arms 41 into the recesses 42, the jaws 31 will be tightly forced against the branch or water connection on the hydrant, as in Fig. 3. When the yoke is pulled outwardly as shown in Fig. 4, the jaws 31 will be permitted to operate under the action of the springs 39 and the said jaws will thus be operated from the hydrant connection. The said yoke 40 is preferably provided with a handle 44 by which it may be moved back and forth. It will be understood also that after the handle 44 has been used to thrust the yoke inwardly and draw the jaws against the threads of the plug connections, that by pressing on the said handle to twist or turn the jaws or said plug connections, the seat member 9 may be drawn tightly against the end of said plug connection, because of the jaws being screwed upon the threads of said plug connection. When the connection is to be detached, the handle 44 is moved so as to slightly release the coupling from the edge of said plug outlet or connection, after which the yoke can be easily pulled outwardly for permitting of the separation of the jaws. Pins 45 may be placed in the ends of the yoke arms to prevent the pulling out of the yoke to too great an extent.

The structure of the coupling just described may be somewhat varied within the spirit of invention. As shown in Figs. 5, 6 and 7 for instance, an auxiliary means may be employed in addition to the jaws 31 for forcing the gasket 10 of the member 9 against the seat on the end of the plug projection or connection 36. As shown in these figures, the structure of the parts already described may be substantially the same as above set forth and another set of numerals thereon will not be required. In this form of the device, a space is left between the shoulder 25 on the member 9 and the ring 26 whereby recesses may be left between the parts to receive the arms 46 of a yoke 47. The arms 46 of the said yoke 47 are reduced at their outer ends, an inclined portion 48 being left to act as wedges or cam surfaces for separating the ring 26 and the shoulder 25. Pins 49 in the ends of said arms 46 prevent the accidental withdrawal of the yoke 47 from the device. With this form of the device, when the jaws have been slipped over the threaded end of the outlet projection of the plug and have been brought together upon the threads thereof, the yoke 47 can be pushed inwardly whereby the gasket carrying edge of the shoulder 25 will be pressed tightly against the seat end of the plug projection thus forming a water tight joint between the parts. In other respects the forms of the device illustrated are substantially identical.

In use either form of the device may be readily attached to or detached from the discharge outlet of the hydrant or plug by the pushing inwardly or the pulling outwardly of the yoke 40 and in the first form of the device giving the yoke and the jaws a slight turn, as for instance a quarter turn upon the plug connection, and in the second form pushing inwardly the yoke 47 for tightening the contact between the coupling and the plug. It will be evident that the minor details of construction may be considerably varied without departing in the least from the spirit of the invention.

What is claimed is:

1. A coupling of the character referred to, comprising in combination with a tubular seating member, jaw members adapted to be moved toward and from each other at opposite sides of said seating member, and an operating member for moving said jaws, said operating member having a straight sliding movement transversely of the longitudinal axis of said seating member.

2. In a hose coupling, two jaw members mounted to be moved toward and from each other, spring means normally moving said jaw members apart, and an operating yoke having two cam portions connected respectively with said jaw members and movable together in straight lines transversely of the longitudinal axis of said jaw members, whereby to positively move the same toward each other.

3. A hose coupling having separable jaw portions provided with interior threads adapted to fit upon the threads of a member with which a coupling is to be made, a yoke having wedging arms adapted to move the jaws together, and means normally tending to open said jaws.

4. A hose coupling comprising in combination, a member adapted to be secured to a hose and having an end seat, two jaw members movably mounted thereon and internally threaded, an operating yoke having two cam portions connected with said jaw members and adapted to slide in straight lines therethrough for moving said jaw members toward each other, said yoke member having a handle portion for turning said jaw members together, substantially as described.

5. A hose coupling comprising a seating member adapted to be fastened to a hose, a collar loosely mounted on one end of said member and having guide ways thereon, jaws movable in said guide ways, springs interposed between said jaws for separating them and a yoke member having wedge portions thereon whereby when the yoke member is forced one way it will move the jaws together and when it is moved in the other way it will permit the jaws to separate.

6. A coupling mechanism for hose pipe connections comprising a member having a seating end portion, a jaw carrying member mounted thereon having radially extending guide ways, quick detachable jaws having means for engaging the said guide ways, means for separating the jaws and a double wedge mechanism adapted to force the jaws together upon a part with which the coupling is to be made.

7. A quick detachable coupling comprising a seat member, a collar mounted thereon having brackets adapted to hold jaws in place, jaws movable on said brackets and having internally threaded faces adapted to engage the threaded connection of a water supply mechanism, the jaws having projections thereon provided with passages thereon and a wedged yoke mechanism adapted to engage said passages for moving the jaws together and forming a quick detachable means of the said jaws.

8. A quick detachable hose coupling, comprising in combination a member to be attached to the hose, oppositely disposed projections thereon having guideways therein, jaw members slidably connected with said guideways and movable toward and from each other, said jaw members being internally threaded, and an operating yoke having two wedge shaped arms slidably connected, respectively, with said jaws, and movable in straight lines transversely of the axis of said coupling, whereby to positively move said jaws toward each other.

9. A quick detachable coupling for connecting piping with water plugs comprising a member having a seating edge adapted to connect with the outlet of a plug, a collar carried by said device and bearing against the seating edge portion thereof, expansible jaws carried by said collar, means for opening and closing the jaws, a yoke member having wedging portions thereon adapted to be thrust between the collar and the said seating edge portion after the jaws have been contracted upon the outlet of the hydrant, whereby the parts are forced tightly together.

In testimony whereof, I have hereunto set my hand, in presence of two witnesses.

WATT L. MORELAND.

Witnesses:
 CASSELL SEVERANCE,
 EARLE R. POLLARD.

Copies of this patent may be obtained for five cents each, by addressing the "Commissioner of Patents, Washington, D. C."